United States Patent
Schindele et al.

(10) Patent No.: US 9,048,768 B2
(45) Date of Patent: Jun. 2, 2015

(54) STATIONARY ENERGY GENERATION PLANT HAVING A CONTROL DEVICE AND METHOD FOR CONTROLLING THE SAME

(75) Inventors: Lothar Schindele, Renningen (DE); Boris Buchtala, Muehlacker (DE); Anton Paweletz, Fellbach (DE); Bernd Schnurr, Lohr-Sendelbach (DE); Andreas Vath, Leidersbach (DE)

(73) Assignee: Robert Bosch GmbH, Stuttgart (DE)

( * ) Notice: Subject to any disclaimer, the term of this patent is extended or adjusted under 35 U.S.C. 154(b) by 765 days.

(21) Appl. No.: 13/140,782

(22) PCT Filed: Nov. 25, 2009

(86) PCT No.: PCT/EP2009/008367
§ 371 (c)(1),
(2), (4) Date: Oct. 7, 2011

(87) PCT Pub. No.: WO2010/069456
PCT Pub. Date: Jun. 24, 2010

(65) Prior Publication Data
US 2012/0032440 A1    Feb. 9, 2012

(30) Foreign Application Priority Data

Dec. 19, 2008   (DE) .......................... 10 2008 063 871

(51) Int. Cl.
*H02P 9/10* (2006.01)
*F03D 7/04* (2006.01)
*F03D 7/02* (2006.01)

(52) U.S. Cl.
CPC ............... *H02P 9/105* (2013.01); *F03D 7/045* (2013.01); *F03D 7/0272* (2013.01);
(Continued)

(58) Field of Classification Search
CPC ..... F03D 7/0272; F03D 7/0296; F03D 7/045; H02P 9/105; F05B 2260/96; Y02E 10/723
USPC ............................ 290/44, 55, 7; 700/286–290
See application file for complete search history.

(56) References Cited

U.S. PATENT DOCUMENTS 7,309,930 B2 * 12/2007 Suryanarayanan et al. .... 290/55
7,692,322 B2 *  4/2010 Wakasa et al. .................. 290/44
(Continued)

FOREIGN PATENT DOCUMENTS

DE             103 26 816      1/2005
DE      10 2007 021 513       1/2008
(Continued)

OTHER PUBLICATIONS

Brekken et al., Control of a Doubly Fed Induction Wind Generator Under Unbalanced Grid Voltage Conditions, IEEE Transactions on Energy Consversion, Mar. 2007, pp. 129-135, vol. 22, No. 1, LNKD-DOI: 10.1109/TEC.2006.889550, INSPEC Accession No. 9327611, ISSN: 0885-8969, Institute of Electrical and Electronics Engineers, IEEE Service Center, Piscataway, NJ, USA (7 pages).
(Continued)

*Primary Examiner* — Tulsidas C Patel
*Assistant Examiner* — Viet Nguyen
(74) *Attorney, Agent, or Firm* — Maginot, Moore & Beck LLP

(57) ABSTRACT

A stationary energy generation plant includes a control device that serves to control current and energy flow. The energy generation plant includes at least one mechanically driven rotor and a generator mechanically coupled to the rotor. To this end, power electronics operationally connected to the generator enable variable energy flow from the rotor through the generator and the power electronics to a load. In order to compensate for vibrational loads on the generator side, at least one current control is made possible by means of a first intermediate circuit storage of the power electronics. In order to compensate for mechanical vibrational loads and transients of a drivetrain, an energy flow control is provided by means of at least one additional second intermediate circuit storage disposed in the power electronics and having a multiple of the storage capacity of the first intermediate circuit storage.

7 Claims, 4 Drawing Sheets

(52) U.S. Cl.
CPC .......... *F03D 7/0296* (2013.01); *F05B 2260/96* (2013.01); *F05B 2270/328* (2013.01); *Y02E 10/723* (2013.01); *H02P 2101/15* (2015.01)

(56) References Cited

U.S. PATENT DOCUMENTS

| | | | | |
|---|---|---|---|---|
| 8,057,174 | B2 * | 11/2011 | Scholte-Wassink | 416/35 |
| 8,428,784 | B2 * | 4/2013 | Krueger | 700/287 |
| 8,478,448 | B2 * | 7/2013 | Krueger | 700/286 |
| 2002/0091471 | A1 | 7/2002 | Suzuki | |
| 2006/0033338 | A1 * | 2/2006 | Wilson | 290/44 |
| 2009/0212565 | A1 * | 8/2009 | Kabatzke et al. | 290/44 |
| 2009/0230681 | A1 * | 9/2009 | Scholte-Wassink | 290/44 |
| 2009/0263245 | A1 * | 10/2009 | Shi et al. | 416/43 |
| 2010/0056315 | A1 * | 3/2010 | Scholte-Wassink | 475/159 |

FOREIGN PATENT DOCUMENTS

| | | |
|---|---|---|
| DE | 10 2007 008 761 | 8/2008 |
| EP | 1 719 910 | 11/2006 |
| WO | WO 2007140787 A1 * | 12/2007 |

OTHER PUBLICATIONS

International Search Report corresponding to PCT Application No. PCT/EP2009/008367, mailed Jun. 25, 2010 (German and English language document) (7 pages).

* cited by examiner

STATIONARY ENERGY GENERATION PLANT HAVING A CONTROL DEVICE AND METHOD FOR CONTROLLING THE SAME

This application is a 35 U.S.C. §371 National Stage Application of PCT/EP2009/008367, filed Nov. 25, 2009, which claims the benefit of priority to Application Serial No. DE 10 2008 063 871.4, filed Dec. 19, 2008 in Germany.

BACKGROUND

The disclosure relates to a stationary energy generation plant having a control device, and to a method for controlling the same. The control device is used to control current and energy flow. The energy generation plant has at least one mechanically driven rotor and a generator which is coupled to the rotor. For this purpose, power electronics which are operatively connected to the generator allow a variable energy flow from the rotor through the generator and the power electronics to a load. The control device is intended to react to the oscillations in the frequency spectrum from a number of tenths of a Hz to a number of tens of Hz on the rotor side and a number of tens of Hz to a number of hundreds of Hz on the generator side, and to control the plant, such that a virtually constant power can be emitted to the load or to the grid system and, in the process, the undesirable oscillations in the drive train of the energy generation plant do not build up or increase.

For this purpose, the document DE 10 2007 021 513 A1 discloses a resistive torque oscillation damping system and method. This torque resistance damping system has a sensor for the shaft of a machine, which sensor is configured such that it can detect a signal which represents the torque on the shaft. Furthermore, a control is provided, which is configured such that it can use the detected signal in order to identify the presence of a torque oscillation occurring on the shaft, if this corresponds to a natural frequency of the shaft. In order now to generate monitoring signals for damping the torque oscillation, the torque resistance damping system has a damper which has a damping converter and a resistance, which are coupled to a direct-current output of the damping converter. In this case, the damping converter is coupled to the machine through a current channel, and has a rating of less than or equal to 5% of the nominal power of the machine.

When this torque oscillation damping system is used in an energy generation plant, it has the disadvantage that virtually 5% of the generated energy is converted to heat, thus resulting in a loss. The efficiency of an energy generation plant such as this is correspondingly reduced.

SUMMARY

The object of the disclosure is to provide a stationary energy generation plant having a control device, in which the energy flows which result from the oscillations can be utilized in order both to reduce the oscillations and to generate energy at oscillation peaks, as well as to fill oscillation troughs in from the energy that is generated.

The object is achieved by the subject matter of the independent claims. Advantageous developments result from the dependent claims.

According to the disclosure, a stationary energy generation plant is provided having a control device and a method for controlling the same. The control device is used to control current and energy flow. The energy generation plant has at least one mechanically driven rotor and a generator which is coupled to the rotor. For this purpose, power electronics which are operatively connected to the generator allow a variable energy flow from the rotor through the generator and the power electronics to a load or to the grid system. In order to compensate for generator-side oscillating loads, provision is made to allow at least one current control with the aid of a first intermediate-circuit store in the power electronics. In addition, in order to compensate for mechanical oscillating loads and disturbance variables in a drive train, energy flow control is provided, with the aid of at least one additional, second intermediate-circuit store which is arranged in the power electronics and has a number of times the storage capacity of the first intermediate-circuit store.

This stationary energy generation plant has the advantage that the generator-side oscillations in the frequency spectrum from a number of tens of Hz up to a number of hundreds of Hz, which could possibly cause resonances in the mechanical part of the energy generation plant, can be compensated for by the current control, which interacts with the first intermediate-circuit store in the power electronics, as a result of which neither are any natural oscillations excited nor can any oscillations build up.

Furthermore, the stationary energy generation plant according to the disclosure has the advantage that, because of the energy flow control, rotor-side oscillations in the frequency spectrum between a number of tens of a Hz and a number of tens of Hz are compensated for by the provision of an additional second intermediate-circuit store, which has a number of times the storage capacity of the first intermediate-circuit store, as a result of which energy at oscillation peaks is first of all stored, and can flow back into the drive train in oscillation troughs, thus allowing the components of the drive train to be designed for relatively constant loads, thus leading to considerable weight savings.

The stationary energy generation plant is preferably a wind energy plant, which is also referred to as a wind energy plant or wind power plant, and will be explained in more detail together with FIGS. 1 and 3.

In one preferred embodiment of the disclosure, the current control is designed such that the electrical real power which is emitted to a grid system or to the load remains constant by means of torque control, and the changes in the real power and the reactive power which result from the current control are compensated for in an intermediate circuit of the power electronics, or can temporarily additionally be converted to heat in the generator windings and/or in converters. This variant has the advantage that it is not reliant on a further additional intermediate-circuit store with several times the storage capacity of the first intermediate-circuit store, and, in particular, can compensate for generator-side oscillations from the critical frequency spectrum up to several tens of Hz, without increasing the complexity for the power electronics.

Furthermore, provision is also made for a model of the energy generation plant to have two active elements in the form of a wind power input, for example by the rotor, and electrical power output, for example by the generator, with passive elements such as inductances and capacitances arranged between them, as well as spring stiffnesses of the structural elements, such as a step-up transmission. A model such as this can provide closed-loop control simultaneously with the aid of appropriately arranged angle position sensors within the energy generation plant, in order to avoid critical frequency ranges which could excite natural oscillations. For this purpose, the energy generation plant may have a central control unit, in which an equation system which describes the model is simulated in parallel and on-line. This makes it possible to control generator-side relatively high transient oscillations and the resonant oscillations in the drive train by the current control of the generator.

Rotation angle position sensors are preferably arranged at least at the shaft end of the generator rotor, on the drive axis of the generator and on the rotor, whose measured values represent input variables for the central control unit mentioned above, in which parameters of the model are stored. For this purpose, the energy generation plant may have at least one wind sensor and a sensor for the rotor blade pitch angle, in addition to the rotation angle position sensors. Further improvements in the matching of the model to the actual energy generation plant are also possible by means of sensors such as these, and can prevent oscillations from building up.

The drive train preferably has a step-up transmission which is arranged between a drive shaft, which is coupled to the rotor, and an output-drive shaft, which is coupled to the step-up transmission. A step-up transmission such as this steps the relatively low frequency of the rotor up to correspondingly higher rotation speeds for the generator.

In addition, a further preferred embodiment of the energy generation plant provides for the drive shaft and/or the output-drive shaft to have a clutch. These may be safety clutches which rigidly connect the drive shaft of the rotor to the drive shaft of the transmission and furthermore connect the output-drive shaft of the transmission to the drive shaft of the generator, or may be switchable clutches, which decouple the shafts and allow freewheeling in the event of an extreme load. In addition, braking apparatuses can be provided both on the drive shaft and on the output-drive shaft of the transmission. However, these are used only to improve the functionality of the energy generation plant and are used only to a lesser extent, or not at all, to compensate for oscillations occurring in the energy generation plant.

One method for controlling an energy generation plant has the following method steps. First of all, angle position sensors are arranged in a drive train of the energy generation plant, which energy generation plant has at least one mechanical rotor, a drive shaft, a step-up transmission, an output-drive shaft, a generator with a rotor/stator unit and power electronics. The arrangement of the position sensors now makes it possible to detect rotation angle differences $f_1$-$f_2$, $f_2$-$f_3$, $f_3$-$f_4$ and $f_4$-$f_5$ by means of the position sensors, for example by monitoring the rotation angle increase $\Delta\phi_1$, $\Delta\phi_2$, $\Delta\phi_3$ of the step-up transmission and the total twist $\Delta\phi_A$ of the drive train. A parallel simulation by means of an equation system is carried out in real time in a central control unit on the basis of a model of the energy generation plant comprising mass and spring damping elements. The electromagnetic model element of the generator is represented as a component of the overall model in the wind farm coordinate system (d,q,0). In this case, nominal values are generated for a current change difference $\Delta I_q$ and a phase difference $\Delta\gamma$ of the current with respect to a generator voltage in order to compensate for transient oscillations in the energy generation plant.

A method such as this has the advantage that matching of the model to the actually occurring and measured load and oscillation states makes it possible to provide closed-loop control at the correct time and at an early stage by means of a current control and an energy flow control, in order to compensate for such oscillations and disturbance variables in the energy generation plant, and to emit a constant real power to the grid system or to a load.

A dynamic model of the energy generation plant is preferably stored in a control unit, comprising matrix equations, which additively links torque vectors to a matrix of area moments of inertia, a matrix of stiffnesses, and a matrix of dampings, and in the process takes account of torque vectors with respect to a rotor torque and an electromechanical torque of the generator. In this case, the method is able to take account of linear and non-linear parameters in the model, as a function of the respective variables, such as the torque, rotation speed and angle of revolution of the components of the drive train. For the method, the current control is designed such that three-phase control allows the electrical real power in the grid system or emitted to the load to remain constant, and allows the change in the real power and the reactive power resulting from the current control to be compensated for in an intermediate circuit in the power electronics, or to be temporarily additionally converted to heat in the generator windings and/or in converters.

A further aspect of the disclosure provides that the basic model of the energy generation plant takes account of two active elements in the form of a wind power input and electrical power output with passive elements arranged between them, such as inductances and capacitances as well as spring stiffnesses of the structural elements. In this case, the generator-side relatively high transient oscillations and the resonant oscillations in the drive train can be controlled by the current control of the generator, without having to provide an additional store with several times the storage capacity of the existing intermediate-circuit store in the power electronics.

Furthermore, rotation angle position sensors are arranged at least on the output-drive shaft of the generator, on the drive shaft of the generator and on the rotor, and their measured values provide variables for the central control unit. Furthermore, in addition to the rotation angle position sensors, the wind conditions are detected by a wind sensor, and are taken into account in the model. The same applies to the rotor blade position, which is detected via a sensor for the rotor blade pitch angle, and can also be included in the model.

BRIEF DESCRIPTION OF THE DRAWINGS

The disclosure will now be explained in more detail with reference to the following figures.

DETAILED DESCRIPTION

Figure 1:
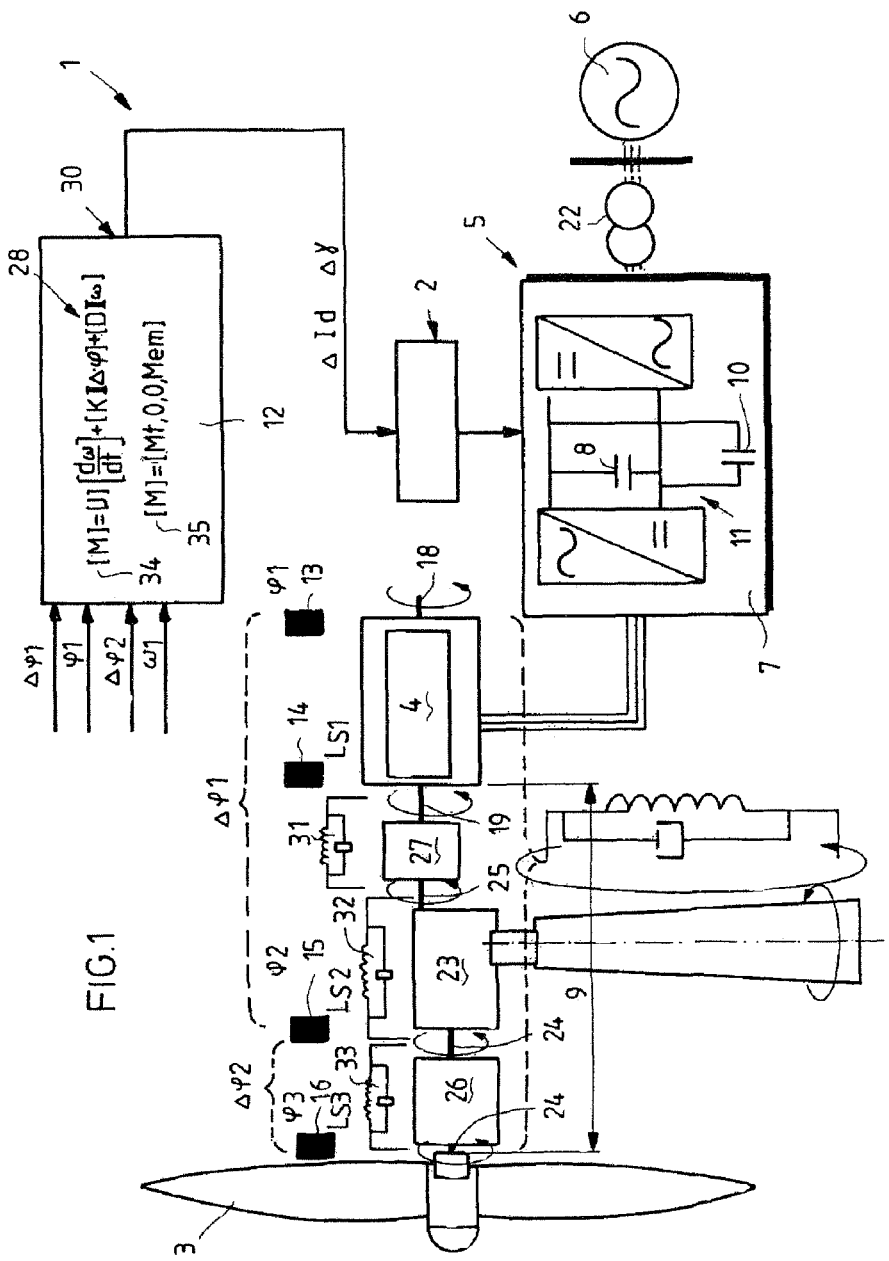
FIG. 1 shows an outline sketch of an energy generation plant according to a first embodiment of the disclosure.

FIG. 1 shows an outline sketch of an energy generation plant 1 according to a first embodiment of the disclosure. In this embodiment of the disclosure, this energy generation plant has a mechanically driven rotor 3, which causes a step-up transmission 23 to rotate via a drive shaft 24 and a clutch 26, with the output-drive shaft 25 of the step-up transmission being mechanically connected via a further clutch 27 to the drive shaft 19 of a generator 4, which has a shaft end 18 of the generator rotor, on which a first rotation position angle sensor 13 is arranged. Further rotation angle position sensors 14 to 16 are provided in the drive train 9 relative to this rotation angle position sensor 13, which detects a reference value. A rotation angle position sensor 14 is arranged on the drive shaft 19 of the transmission, a further rotation angle position sensor 15 is arranged on the drive shaft of the step-up transmission 23, and, finally, a rotation angle position sensor 16 is arranged at the start of the output-drive train 9 with the drive shaft 24, which interacts with the rotor 3. At least in the drive train 9, components such as the clutches and the step-up transmission are provided between these rotation angle position sensors 13 to 16, as well as the drive and output-drive shafts themselves, which in theory can be included in a model calculation by means of the mass and spring damping elements 31, 32 and 33.

Power electronics are connected to the generator output, by means of which a relatively constant electrical power can be fed into the grid system or the load 6 via the transformer despite the different incident flow on the rotor 3. For this purpose, a rotor blade pitch angle is matched to the different wind speed. In the event of wind gusts or other disturbance variables, which can act on the rotor 3, it is, however, possible for oscillations to occur in the drive train 9, and oscillation phenomena can also be expected on the generator side. While the frequency spectrum of the oscillations on the rotor side is from a number of tenths of Hz up to a number of tens of Hz, a frequency spectrum between a number of tens of Hz and a number of hundreds of Hz occurs on the generator side. These generator-side oscillations can be compensated for by means of a first intermediate circuit store 8, which in this embodiment of the disclosure is a capacitor, and is arranged in an intermediate circuit 11 of the power electronics 5. To this end, provision is made for current control 7 to be provided for the power electronics 5, with a current control device 2 acting on the intermediate circuit 11 of the power electronics 5.

The control device 2 receives nominal value presets for a current difference $\Delta Iq$ and a phase difference $\Delta \gamma$ from a central control unit 30, in which parallel simulation is used to evaluate a model which operates with an equation system 28 comprising matrix equations 34 and 35. For this purpose, rotation angle increases $\Delta \phi_1$ and $\Delta \phi_2$ are introduced into the central control unit 30, as well as the rotation speed $\omega_1$ of the generator rotor. In addition, the rotation angle $f_1$, which is determined by means of the rotation angle position sensor 13 at the shaft end 18 of the generator rotor, is input to the central control unit 30 as an output of the rotation angle increases $\Delta \phi_1$ and $\Delta \phi_2$.

The nominal values of a current difference and of a phase difference are entered in the control device 2 with the aid of the matrix state equations 34 and 35 and are converted to appropriate pulse patterns of the power transistors in the frequency converter of the power electronics 5, acting on the intermediate circuit of the power electronics 5, as already described above. This design of the energy generation plant and of the central control unit 30 with rotation angle positions of the drive train 9 and of the generator 4 being evaluated makes it possible to compensate for generator-side oscillations solely by means of the first intermediate-circuit store 8, such that, on the one hand, they do not build up to higher amplitudes and are ideally completely suppressed and such that, on the other hand, a constant real power can be emitted to the grid system or to the load 6.

The current regulation is not sufficient to compensate for rotor-side oscillations in the drive train 9 in the frequency range mentioned above between a number of tenths of a Hz and the number of tens of Hz, as a result of which the model provides energy flow regulation which interacts with a further additional intermediate-circuit store 10, whose storage capacity is many times greater than that of the first intermediate-circuit store 8. In the event of rotor-side disturbance variables or oscillations in the drive train 9, energy at an oscillation peak is stored in the additional intermediate-circuit store, and is fed back in oscillation troughs, as a result of which none of the drive of output-drive shafts are overloaded, and likewise nor are the components of the drive train 9 arranged between them, but they can in fact be operated at their permissible load level with respect to the torques which occur. It is therefore possible to use this combined regulation comprising current regulation and energy flow regulation, based on the matrix equations 34 and 35, to achieve a very high level of efficiency with minimal material complexity at the same time for the components of the drive train, and to suppress the excitation of natural frequencies in the energy generation plant.

Figure 2:
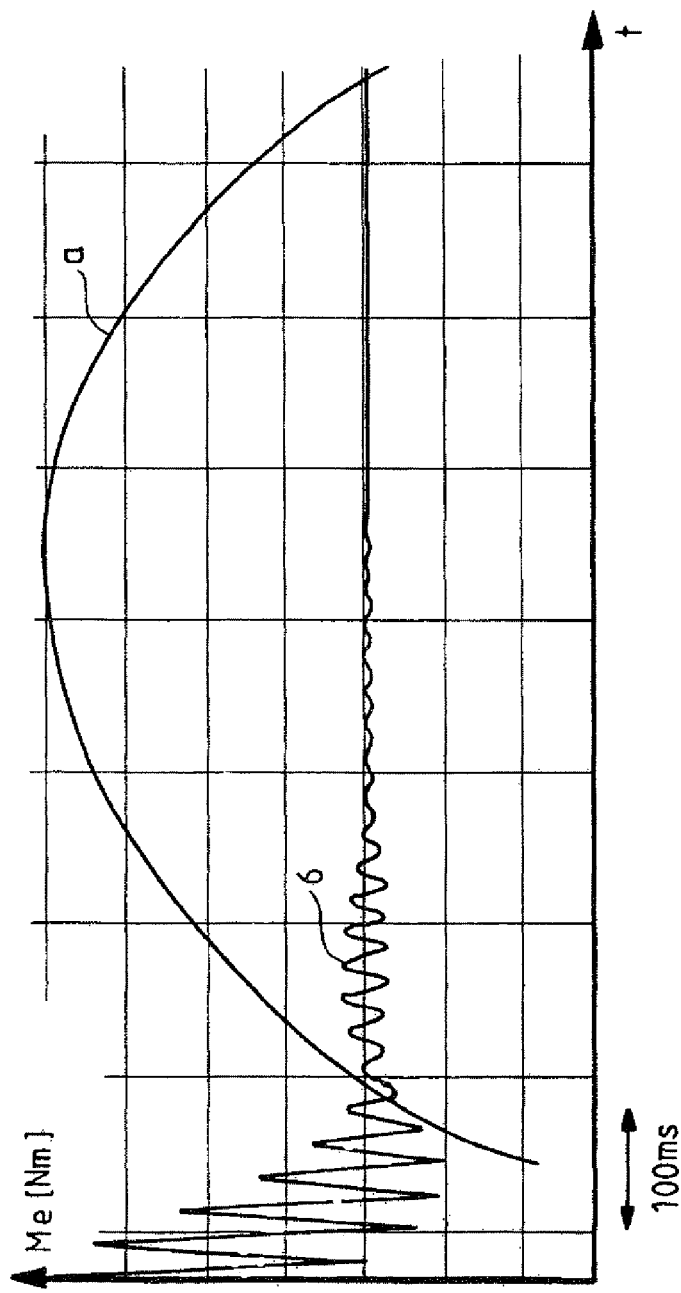
FIG. 2 shows a schematic diagram of the oscillation behavior of an energy generation plant as shown in FIG. 1.

FIG. 2 shows a schematic diagram of the oscillation response of an energy generation plant as shown in FIG. 1. For this purpose, the torque or torsion moment is plotted on the ordinate in Newton meters, and the time t is plotted in intervals of 100 milliseconds on the abscissa. The curve a shows half a period of an oscillation, as can occur on the rotor side in the drive train 9, compared with generation-side oscillations which produce a torque Me which, as is shown by the graph b, oscillates at a considerably higher frequency. In this case, the current regulating device 2 shown in FIG. 1 ensures that such oscillations in the upper frequency range decay, as shown by the curve b.

Figure 3:
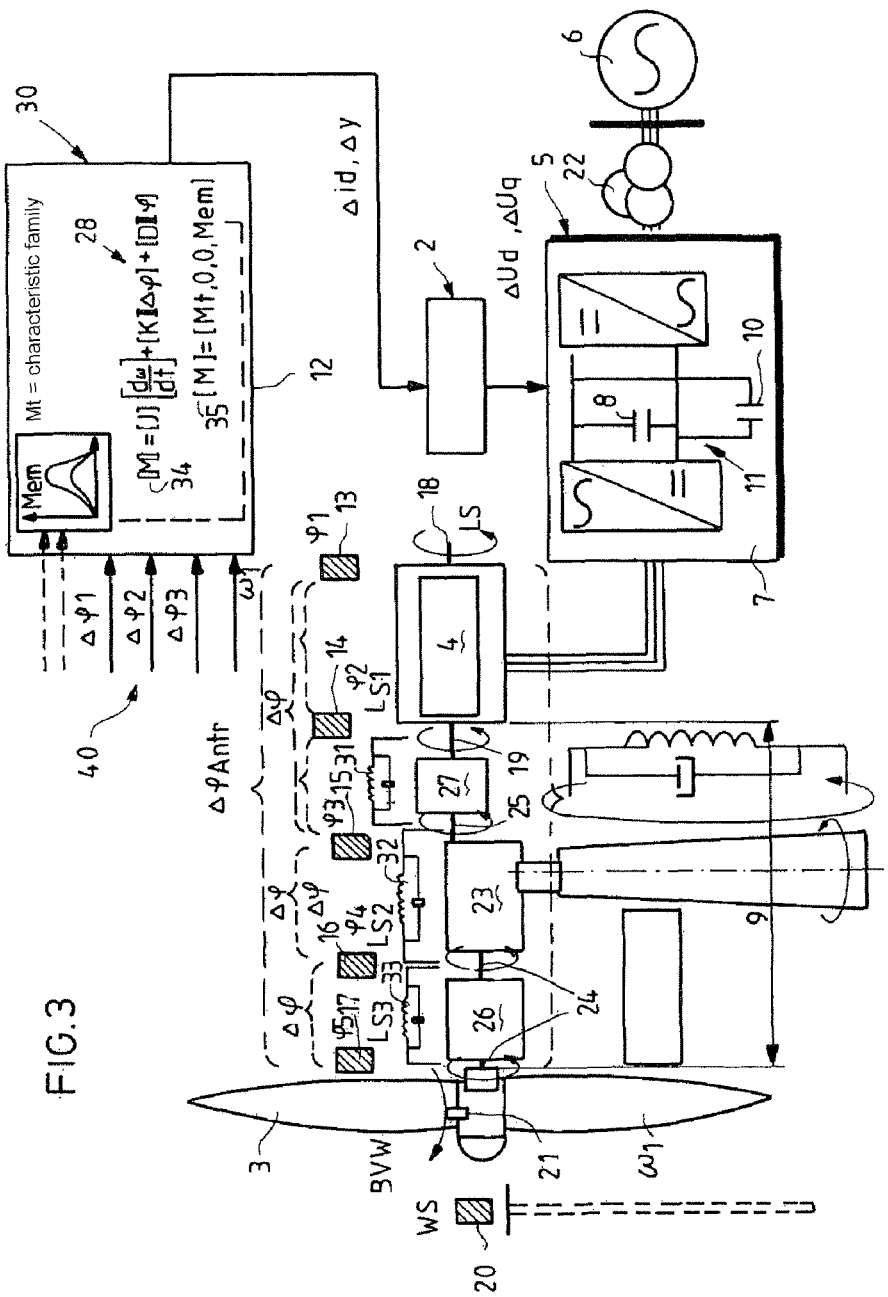
FIG. 3 shows an outline sketch of an energy generation plant according to a second embodiment of the disclosure.

FIG. 3 shows an outline sketch of an energy generation plant 40 according to a second embodiment of the disclosure. The difference from the first embodiment of the disclosure is that a further angle position sensor is provided in the drive train 9, thus resulting in a total of five angle position sensors 13 to 17 being available for assessment and measurement of the oscillation risk. The number of rotation angle increase inputs is correspondingly increased, as a result of which not only $\Delta \phi_1$ and $\Delta \phi_2$, but additionally $\Delta \phi_3$, are now entered in the central control unit 30. Furthermore, a family of torque characteristics for the wind turbine is stored in the central control unit 30, relating to the electromagnetic torques on the generator. Furthermore, in this second embodiment of the disclosure, a further improvement in the reliability of the model is obtained by a wind sensor 20 and a sensor 21 for the rotor blade pitch angle (BPA), by including the measured sensor data relating to the wind speed and pitch angle in the model of the energy generation plant as well, in order to make the calculation of the current nominal value and the phase shift between the current and the generator voltage more precise.

Figure 4:
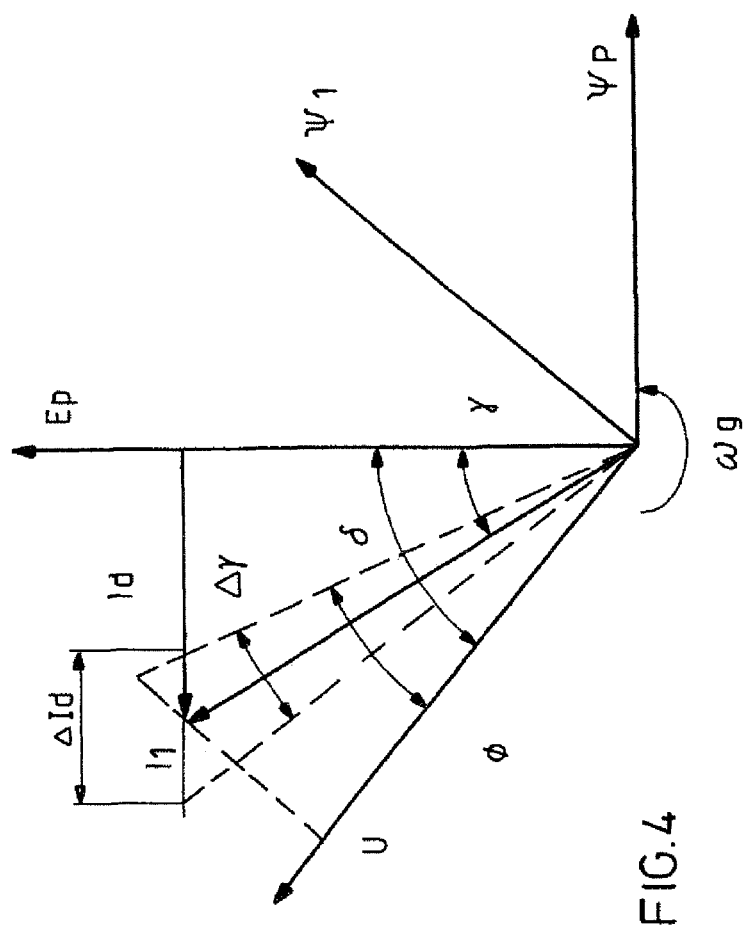
FIG. 4 shows a schematic vector diagram of a generator in an energy generation plant as shown in FIG. 1 or FIG. 2.

FIG. 4 shows a schematic vector diagram of a generator in an energy generation plant as shown in FIG. 1 or FIG. 2. This vector diagram as shown in FIG. 4 rotates at the rotation frequency $\omega_g$ of the generator rotor, with the respective current and voltage vectors I and U leading the vector of the rotor voltage $E_p$ and the electromotive force by the phases $\gamma$ for the current I and d for the voltage U, with $\delta > \gamma$ in our load situation.

While $\Psi_p$ indicates the linked magnetic flux through the rotor when the generator is on no load, the vector $\Psi_1$ denotes the vectorial sum of the field reaction of the stator and the linked magnetic flux through the rotor. In this case, in this diagram, the voltage vector U leads the current vector I by the phase difference F, thus resulting in the electrical real power $P = U \cdot I \cdot \cos F$. The central controller outputs nominal values $\Delta I_q$ and $\Delta \gamma$ with the aid of the model shown in the preceding figures, predetermining the change in the phase angle of the current I with respect to the generator voltage U, in order to compensate for generator-side oscillations.

LIST OF REFERENCE SYMBOLS

1 Stationary energy generation plant (first embodiment)
2 Control device
3 Rotor
4 Generator 5 Power electronics with a frequency converter
6 Load or grid system
7 Current control
8 First intermediate-circuit store
9 Drive train
10 Second intermediate-circuit store
11 Intermediate circuit
12 Model
13 Rotation angle position sensor
14 Rotation angle position sensor
15 Rotation angle position sensor
16 Rotation angle position sensor
17 Rotation angle position sensor
18 Shaft end of the generator rotor
19 Drive shaft of the generator
20 Wind sensor
21 Sensor for the rotor blade pitch angle
22 Transformer
23 Step-up transmission
24 Drive shaft of the energy generation plant
25 Output-drive shaft of the step-up transmission
26 Clutch in the drive shaft
27 Clutch in the output-drive shaft
28 Equation system
30 Central control unit
31 Mass and spring damping element
32 Mass and spring damping element
33 Mass and spring damping element
34 Matrix equation
35 Matrix equation
40 Energy generation plant (second embodiment)
$\Delta$Id Current change difference
I Generator current
U Generator voltage
P Real power
Q Reactive power
$\Delta y$ Phase difference
$f_A$ Total twist in the drive train
$f_1$ to $f_5$ positions
$\Delta\phi_1$ to $\Delta\phi_3$ Rotation angle increase

The invention claimed is:

1. A method for controlling an energy generation plant, comprising arrangement of position sensors in a drive train of the energy generation plant, which energy generation plant has at least one mechanical rotor, a drive shaft, a step-up transmission, a generator with a rotor/stator unit and power electronics;

detection of rotation angle differences by the position sensors;

monitoring the rotation angle increase of the step-up transmission and the overall twisting of the drive train;

parallel simulation by an equation system in a central control unit on the basis of a model of the energy generation plant comprising mass and spring damping elements; and generation of nominal values for a current change difference and a phase difference of the current with respect to a generator voltage, the nominal values being used by a current control of the generator to compensate for transient oscillations in the energy generation plant, wherein the model of the energy generation plant takes account of two active elements in the form of a wind power input and electrical power output with passive elements arranged between them, the passive elements including inductances, capacitances, and spring stiffnesses of structural elements.

2. The method as claimed in claim 1, wherein the model of the energy generation plant is stored in the central control unit, and wherein the central control unit is configured to use matrix equations to additively link torque vectors with a matrix of area moments of inertia, a matrix of stiffnesses and a matrix of dampings, the torque vectors being based on a rotor torque and an electromechanical torque of the generator.

3. The method as claimed in claim 1, wherein the model takes account of linear and non-linear parameters as functions of the respective variables, the variables including torque, rotation speed and twist angle of the components of the drive train.

4. The method as claimed in claim 1, wherein oscillations in the frequency spectrum from a number of tenths of a Hz to a number of tens of Hz on the rotor side and a number of tens of Hz to a number of hundreds of Hz on the generator side are taken into account in the model.

5. The method as claimed in claim 1, wherein the current control is designed such that the electrical real power which is emitted into a grid system or to the load remains constant by means of a torque control, and the changes which result from the current control in the real power and the reactive power are compensated for in an intermediate circuit of the power electronics, or are additionally converted to heat in the generator windings and/or in converters.

6. The method as claimed in claim 1, wherein the generator-side higher transient oscillations and the resonant oscillations in the drive train are controlled by the current control of the generator.

7. The method as claimed in claim 1, wherein rotation angle position sensors are arranged at least on the output-drive shaft of the generator, on the drive shaft of the generator and on the rotor, and their measured values provide input variables for the central control unit.

* * * * *